J. Trainer,
Cage Trap,
№ 70,133. Patented Oct. 22, 1867.

Witnesses
J. C. Kemon
C. A. Pettit

Inventor
Joseph Trainor
By Munn & Co.
Attorneys

United States Patent Office.

JOSEPH TRAINER, OF RURAL DALE, OHIO.

Letters Patent No. 70,133, dated October 22, 1867.

---

IMPROVED ANIMAL TRAP.

---

*The Schedule referred to in these Letters Patent and making part of the same.*

---

TO ALL WHOM IT MAY CONCERN:

Be it known that I, JOSEPH TRAINER, of Rural Dale, in the county of Muskingum, and State of Ohio, have invented a new and improved Animal Trap; and I do hereby declare the following to be a full, clear, and exact description of the same, reference being had to the accompanying drawings, forming part of this specification, and in which—

Similar letters of reference indicate corresponding parts in the two figures.

Figure 1:
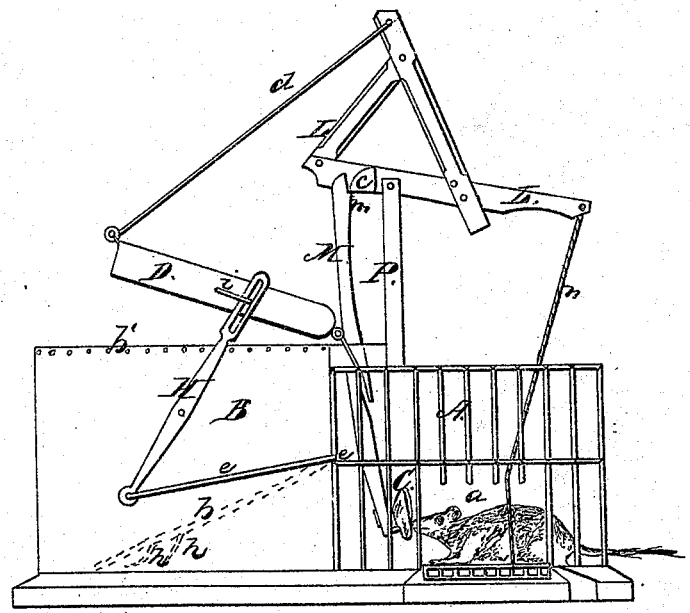
Figure 1 is a side elevation of my invention.
Figure 2:
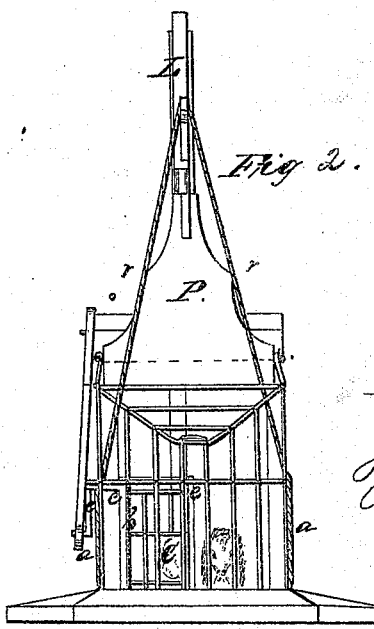
Figure 2 is an end view of the same.

In this invention the trap is constructed with two chambers, in escaping from one to the other of which the animal sets the trap by a novel, simple, and effective apparatus.

In order that others skilled in the art to which my invention appertains may be enabled to make and use the same, I will proceed to describe it in detail.

In the drawings A represents the first chamber, into which the animal enters through the gate $a$. B represents the second chamber, which the animal enters through the gate $b$ leading from chamber A. The outer chamber A is made of wire, the inner, B, being constructed of any suitable material, but having a grate-cover, $b'$, through which the animals can be destroyed without opening the trap. Upon a supporting post, P, pivots a lever, L, which shuts the gates $a\ a$ by means of the cords $r\ r$, the gates opening by their own weight when the end of the lever to which the cords are attached is depressed. The opposite end of the lever is connected by a rod, $d$, with a heavy platform, D, hinged to the top of the trap, which, when free to fall, operates the lever by its gravity and closes the gates $a\ a$. A vertical rod, M, pivoted near its centre to the top of the cage, bears the bait C at its lower end in the chamber A, and is provided with a shoulder, $m$, at its top, which catches under a pin or boss, $c$, on the side of the lever, and sets the trap. The rod M may be made to pass through a slot in the hinged platform D, the end wall of which will strike the rod when the platform is raised and insure the setting of the trap. The gate $b$ is hinged at one end to the top of the passage-way which it closes, its opposite end resting on the floor of the inner chamber B. One of the rods $e\ e$, upon which it hinges, is bent round the side of the trap, and attached to a stout wooden rod, H, the opposite end of which is connected with the platform D by means of the pin $i$ working in the slot I in the rod H. Barbs or hooks $h\ h$ may be attached to the under side the gate $b$, if desired, to prevent the escape of the animals by any possibility from the chamber B The operation of a trap thus constructed is as follows: The trap is baited and set, the gates $a\ a$ being open and the gate $b$ closed. The animal enters the chamber A, nibbles the bait, and releases the lever L, which is operated by the weight of the heavy platform D, and closes the gates $a\ a$, confining the animal in the chamber A, from which he will seek to escape through the gate $b$. As he does so he raises the gate $b$, operating the rods $e$ and H, and raising the platform D, which permits the lever L to reverse its position, open the gates $a\ a$, and again set the trap. The gate $b$ closes of its own weight when the animal has passed into the chamber B, the slot $h$ permitting the rod H to fall freely back.

Having thus described my invention, what I claim as new, and desire to secure by Letters Patent, is—

The combination and arrangement of the chambers A B, gates $a\ b$, cords $r\ r$, lever L, vertical hinged rod M, platform D, and connected rods H and $e$, all constructed, combined, and operating together, substantially in the manner and for the purpose specified.

JOSEPH TRAINER.

Witnesses:
  MERCY T. McINTIRE,
  WILLIAM McINTIRE.